Patented Sept. 3, 1929.

1,727,164

UNITED STATES PATENT OFFICE.

CHARLES FISCHER, JR., OF WYOMING, AND WARREN T. REDDISH, OF CINCINNATI, OHIO, ASSIGNORS TO THE KONTOL COMPANY, OF DALLAS, TEXAS, A CORPORATION OF TEXAS.

PROCESS OF TREATING EMULSIONS.

No Drawing.   Application filed September 7, 1926.   Serial No. 134,125.

Our invention relates to the art of decomposing oil and water emulsions, and is particularly directed to accelerating the coalescence and/or stratification of the components of the emulsion.

The disclosure is made with particular reference to the oil and water emulsions which are undesirably incidental to petroleum producing industry, and in the oil fields constitute nuisances. These emulsions consist of oil and water, usually salt water, the percentages of the two components as well as the specie and amount of salt varying over a wide range.

The permanence of these emulsions is, according to present theories, controlled by the relative surface tensions of the oil and the water. One method of decomposing these emulsions is to treat the emulsified oil and water with a surface tension depressant which, according to theory, alters the relative surface tensions of the components, breaks the permanence of the emulsion and starts coalescence of the components. After coalescence has proceeded to a certain degree, the oil and water can be stratified by gravity settling, centrifugal force, filtration or other means and the readiness of the liquid mass for the stratification varies directly with the degree of coalescence, i. e. the size of the gathered drops. The oil thus becomes free of its water content and is available for commercial use.

One class of chemical reagents adapted to break the permanence of an emulsion is the salts of mineral oil sulphonic acid. The adaptability of several of the members of this class has been verified and their application to the breaking of emulsions is the subject matter of various patents and applications, for instance, Rogers Patent No. 1,299,385, dated April 1, 1919.

The object of our invention is to provide a coalescence accelerator for emulsions of which the permanence has been broken.

Another object of our invention is to provide a coalescence accelerator adapted for use in conjunction with an emulsion breaking reagent of the class described.

Another object of our invention is to provide a reagent particularly adapted to separate the oil and water components of an oil and water emulsion.

The accelerator of coalescence of this invention is an oil soluble bituminous or semi-bituminous substance such as pitches, animal, vegetable or mineral, preferably having a melting point between 35° C. and 95° C. as tested by the ball and ring method of the American Society for Testing Materials specifications.

This substance is mixed with mineral oil sulphonates adapted to break the permanence of the emulsion. The resulting reagent is incorporated in the emulsion in the proportion of approximately one part reagent to one thousand parts emulsion. The liquid mass is then heated to and maintained at a temperature of between 150°–200° F. until stratification takes place. Some emulsions break without the heat treatment.

The bituminous substance gives good results when used with mineral oil sulphonates thinned down with alcohol. Although the bituminous material is quite viscous it has the peculiar effect of further thinning the mixture of sulphonates and alcohol. This provides a reagent which can be easily incorporated in the emulsion.

A particular procedure for making up one reagent is recommended in order to provide against inaccuracies which might result from variations in the materials used. The sodium hydroxide and water are mixed and a sample of the homogeneous aqueous solution is tested for specific gravity at 60° F. The gravity should be 1,327 and if the gravity deviates from this figure, proper adjustment should be made. The presence of carbonates in this solution is to be avoided.

Next is calculated the amount of this particular aqueous sodium hydroxide which is required to neutralize the particular batch of mineral oil sulphonic sludge acids which is to be used in the reagent. Only 92% of the required weight of hydroxide is mixed with the acid thereby leaving the mixture slightly on the acid side. The reaction of the sodium hydroxide with the sulphonic acid develops enough heat to carry on the neutralization without the use of steam coils. Agitation should be continuous until all of the free sodium hydroxide has combined with the acids. Alcohol is added to the compound after it has cooled to 130° F. Bitumen is then heated to a temperature suitable for pumping such as a little bit below 200° F. and is mixed with the sulphonates and alcohol. This pitch further reduces the viscosity of the reagent and renders it easy to handle at ordinary temperatures.